Aug. 2, 1960
R. J. HEPPE
2,947,981
SYNCHRONIZING SYSTEM
Filed July 3, 1956
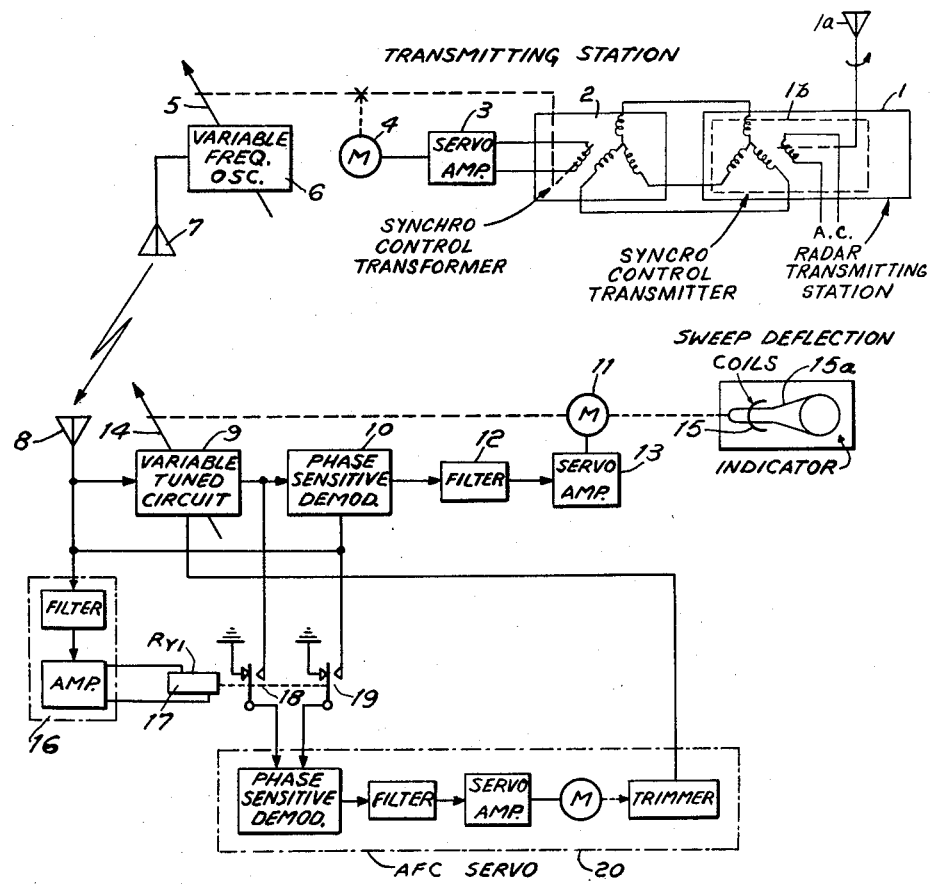
INVENTOR
ROBERT J. HEPPE
BY
ATTORNEY

United States Patent Office 2,947,981
Patented Aug. 2, 1960

2,947,981

SYNCHRONIZING SYSTEM

Robert J. Heppe, North Caldwell, N.J., assignor to International Telephone and Telegraph Corporation, Nutley, N.J., a corporation of Maryland Filed July 3, 1956, Ser. No. 595,615

4 Claims. (Cl. 343—6)

The present invention relates to a servo apparatus for synchronizing a radar echo signal indication pattern with the rotation of a radar antenna and more particularly relates to a servo apparatus as described above where the antenna is at some remote location from the indicating system.

The plan position indicator (P.P.I.) follow-up servo is a popular form of the above described servo apparatus. In the conventional use of the (P.P.I.) follow-up servo there is very often an amplitude modulated signal generated in the form of a sawtooth wave. The generation of the sawtooth waveform often is accomplished by such well known means as causing a potentiometer to be wiped in synchronism with the rotation of the scanning antenna by coupling the wiper for movement with the antenna shaft. This amplitude modulated signal offers to the system a signal which in effect has a different amplitude value representative for each of the various values of degrees of the antenna azimuth position. This voltage is handled in numerous ways (such as an azimuth quantizer) to establish a reference upon which other parts of the system can rely to sense the position of the antenna at any particular time.

With the advent of the ground control approach (GCA) system in connection with aircraft, it was necessary to supply the antenna position information signals to a remote place for indication, since the monitor of the (GCA) system was very often one to two miles away from the antenna, in a control tower. In the (GCA) system great stress was placed on the accuracy of the indicator signal with respect to its being truly representative of the antenna movement. Problems were encountered in that the cables running from the antenna to the indicator were subject to interference from electrostatic couplings between the transmission-line cable and nearby power-line cables. One effort made to overcome this was shielding of the transmission cable.

In a system where it is impractical to directly connect by cable the antenna station and the indicator station it becomes necessary not only to receive the echo signal at the indicator station but, as in a (P.P.I.) arrangement, to make certain that the sweep deflection coil is rotated in true synchronism with the scanning antenna of the radar.

An object of the present invention is to provide a synchronization system which will rotate the sweep deflection coils of the remotely located indicator in accurate synchronism with a scanning antenna of a radar system of the (P.P.I.) type.

A primary feature of this invention is the variable frequency oscillator which acts as a source of the FM signals with such signals varying linearly, for instance, between 300 cycles to 500 cycles. By way of further illustration, at zero degrees of the antenna movement the signal being transmitted is 300 cycles and the signal frequency continues to increase to 359+ degrees where the signal is at 500 cycles. This feature has an advantage of making the system insensitive to amplitude distortions.

A second feature of the invention lies in the means for signal handling at the indicator station. At the indicator station the transmitted signal becomes a reference signal as well as a signal to be demodulated and this makes the system insensitive to phase distortion of the radio link, because any phase shift of the incoming signal gets supplied to both the reference and the signal windings of the phase sensitive demodulator.

A third feature of the invention is a trimming device which, during each 360 degrees scanning operation, trims the variable tuned circuit to compensate for aging or irregular components and thereby assures accurate synchronization.

The above-mentioned and other features and objects of this invention will become more apparent by reference to the following description taken in conjunction with the accompanying drawing in which the sole Figure 1 is a block diagram of the system.

In the drawing a radar transmitter station 1 is shown having a scanning antenna 1a. This antenna 1a is mechanically coupled to the rotor of a synchro control transmitter 1b such as is shown on page 82, volume 25 of the Radiation Laboratory Series, published in 1947 by Mc-Graw-Hill Book Company, Inc., which by means of electromagnetic coupling sets up a voltage vector relationship in a stator portion of the synchro control transformer 2. If the coupling relationship between the stator and rotor portions of the control transformer gives rise to a condition other than a "null" condition, then an error type signal is passed on to the servo amplifier 3 and in turn to the motor 4. The motor 4, being driven by this aforementioned error signal, will drive the rotor portion of the synchro transformer 2 in an effort to find a "null" point. Since the antenna 1a during its scanning operation is continually changing the voltage vector relationship of the stator portion of the synchro transformer 2, the motor will continue to drive the rotor portion in search of the "null" condition. It becomes obvious that if the motor 4 this time is coupled to the variable arm 5 of a variable frequency oscillator, that this variable arm will follow the antenna 1a in a synchronous fashion. The frequency oscillator being properly designed will produce a varying frequency signal, for instance, varying from 300 cycles to 500 cycles as the variable arm 5 moves through the representative or analogous 360 degree distance of the scanning antenna. At the end of each 360° travel the circuit must be ready to repeat the operation of transmitting a signal varying from 300 cycles to 500 cycles. This condition gives rise to a flyback operation with the signal at 359°+ being 500 cycles going to 300 cycles at zero degrees. The continuum of frequency signal represents a signal source having a different value of frequency for each position of the scanning antenna 1a. The varying frequency signal is transmitted over the antenna 7 and received by a remote indicating station antenna 8. This frequency modulated signal is passed simultaneously to a variable tuned circuit 9 and the phase sensitive demodulator 10. A phase error output signal from demodulator 10 is passed on to the motor 11 through the filter 12 and servo amplifier 13. The motor 11 in turn drives the variable arm 14 of the tuned circuit in an effort to correct the error and at the same time drives the sweep deflection coil 15 in synchronism with the varying frequency signal and hence the scanning antenna 1a. It becomes apparent that the presentation of the radar echo signals on the cathode ray tube 15a is in synchronism with the scanning antenna 1a and, therefore, the main purpose of the circuit is accomplished.

To provide a continual check on the components of the tuned circuit 9, means are provided to check and compensate for aging or irregular components contained in the circuitry thereof. This checking and compensating operation is done during the flyback interval of the circuit 9. During this flyback time, when the varying frequency signal goes from 500 cycles to 300 cycles, the frequency sensitive circuit 16 detects this change since this circuit is designed to respond to the large change in frequency which occurs during this flyback interval. The response of this circuit 16 energizes relay 17 and in turn transfers relay contacts 18 and 19. As a result of the transfer of relay contacts 18 and 19, the automatic frequency control (AFC) servo circuit 20 is introduced into the circuit and operates as a trimming device on the variable tuned circuit to compensate for aging or irregular components. After the initial large change of frequency, the relay drops out and the operation continues until the next flyback interval. The (AFC) circuit is, of course, inoperative between flyback intervals.

While I have described above the principles of my invention in connection with specific apparatus, it is to be clearly understood that this description is made only by way of example and not as a limitation to the scope of my invention as set forth in the objects thereof and in the accompanying claims.

I claim:

1. A radar system comprising a radar signal transmitting station having a rotating scanning antenna, means responsive to the azimuth position of said antenna for producing a continuous modulated azimuth signal, said azimuth signal being varied linearly in frequency from $f_1$ to $f_n$ as said antenna rotates from zero degrees to 360 degrees and being characterized by a flyback operation as said signal goes from $f_n$ to $f_1$ during the interval of said antenna movement from 359+ degrees to zero degrees, a radio frequency transmitter for transmitting said azimuth signal, a remotely located radar echo signal indicating station having a cathode ray tube with rotatable sweep deflection coils for indicating purposes, a radio frequency signal receiver antenna, a variable tuned circuit coupled to said receiver antenna, a phase sensitive demodulator circuit coupled to said receiver antenna and to said variable tuned circuit, motor means for moving the variable arm of said tuned circuit and said rotatable sweep deflection coils of said cathode ray tube arrangement, and circuitry means including a servo loop to couple said motor means to the output of said phase sensitive demodulator.

2. A radar system comprising a radar signal transmitting station having a rotating scanning antenna, means responsive to the azimuth position of said antenna for producing an azimuth signal, said azimuth signal being varied linearly in frequency from $f_1$ to $f_n$ as said antenna rotates from zero degrees to 360 degrees and being characterized by a fly-back operation as said signal goes from $f_n$ to $f_1$ during the interval of said antenna movement from 359+ degrees to zero degrees, a radio frequency transmitter for transmitting said azimuth signal, a remotely located radar echo signal indicating station having a cathode ray tube with rotatable sweep deflection coils for indicating purposes, a radio frequency signal receiver antenna, a variable tuned circuit coupled to said receiver antenna, a phase sensitive demodulator circuit coupled to said receiver antenna and to said variable tuned circuit, motor means for moving the variable arm of said tuned circuit and said rotatable sweep deflection coils of said cathode ray tube arrangement, circuitry means including a servo loop to couple said motor means to the output of said phase sensitive demodulator, and a compensation means for correcting said variable tuned circuit for aging and irregular components comprising a frequency sensitive circuit responsive to large changes of frequency coupled to said receiver antenna, a relay, an automatic frequency control circuit, a first circuitry means to couple said frequency sensitive circuit to said relay in order to cause said relay to be energized as a result of the large frequency change experienced at said flyback time interval, a second circuitry means to couple said automatic frequency control circuit through said relay to said variable tuned circuit in order to check and initiate a trimming operation of said variable tuned circuit by way of compensation for aging and irregular components.

3. A system as recited in claim 2 wherein said automatic frequency control circuit comprises at least a second phase sensitive demodulator and a second motor coupled through said relay to said receiver antenna.

4. A radar system which has a remotely located radar echo signal indicating station functioning in synchronism with a scanning antenna at the transmitting station comprising a rotating scanning radar transmitting antenna, a variable frequency oscillator with a variable component, a synchro control transformer having a stator and a rotor portion whose stator portion voltage vector relationship is indicative of every scanning antenna position, a motor coupled to drive said rotor portion of said transformer and simultaneously coupled to drive said variable component of said variable frequency oscillator, a transmitter coupled to said oscillator for transmitting an antenna azimuth position indicating frequency modulated signal, said frequency modulated signal being linearly varied from $f_1$ to $f_n$ as said antenna rotates from zero degrees to 360 degrees and accompanied by a flyback operation as said signal goes from $f_n$ to $f_1$ during interval of antenna travel from 359+ degrees to zero degrees, a remotely located radar echo indicating station with a receiver antenna, a variable tuned circuit with a variable tuning element coupled to said receiver antenna, a first phase sensitive demodulator coupled to said variable tuned circuit and said receiver antenna, a cathode ray tube arrangement including rotatable deflection coils, a motor which is circuitry coupled to said first phase sensitive demodulator and mechanically coupled to drive both the variable tuning element of said variable tuned circuit and said rotatable deflection coils, an automatic frequency control servo loop, a frequency sensitive circuit including a relay coupled to said receiver antenna and responsive to the large changes of frequency experienced during said flyback interval to energize said relay, and means including said relay to couple the automatic frequency control servo loop to said variable tuned receiver and said receiver antenna to check and trim the variable tuned receiver as a compensation for aging or irregular components thereof.

References Cited in the file of this patent

UNITED STATES PATENTS

| | | |
|---|---|---|
| 2,403,603 | Korn | July 9, 1946 |
| 2,462,853 | Frum | Mar. 1, 1949 |
| 2,485,582 | Frum | Oct. 25, 1949 |
| 2,626,390 | Duke | Jan. 20, 1953 |
| 2,698,931 | Van Voorhis | Jan. 4, 1955 |
| 2,795,780 | Gross | June 11, 1957 |